US009124614B2

(12) United States Patent
Ree (10) Patent No.: US 9,124,614 B2
(45) Date of Patent: Sep. 1, 2015

(54) METHODS AND APPARATUSES FOR UTILITY METERS OR OTHER DEVICES WITH COMMUNICATIONS PRIORITIZATION (75) Inventor: Bradley Richard Ree, Cumming, GA (US)

(73) Assignee: General Electric Company, Schenectady, NY (US)

( * ) Notice: Subject to any disclaimer, the term of this patent is extended or adjusted under 35 U.S.C. 154(b) by 532 days.

(21) Appl. No.: 13/028,142

(22) Filed: Feb. 15, 2011

(65) Prior Publication Data
US 2012/0207179 A1    Aug. 16, 2012

(51) Int. Cl.
G08C 17/00    (2006.01)
H04L 29/08    (2006.01)

(52) U.S. Cl.
CPC ..................... *H04L 67/12* (2013.01)

(58) Field of Classification Search
None
See application file for complete search history.

(56) References Cited

U.S. PATENT DOCUMENTS

| | | | | |
|---|---|---|---|---|
| 6,397,061 B1* | 5/2002 | Jordan et al. | ............... | 455/421 |
| 2004/0003302 A1* | 1/2004 | Marshall et al. | ............. | 713/300 |
| 2006/0135143 A1* | 6/2006 | Suematsu | ................. | 455/418 |
| 2006/0145834 A1 | 7/2006 | Berkman et al. | | |
| 2006/0267800 A1* | 11/2006 | Fitzgibbon | ................. | 340/933 |
| 2008/0018491 A1* | 1/2008 | Berkman et al. | ........ | 340/870.02 |

FOREIGN PATENT DOCUMENTS

JP    2004-158908 A    6/2004

OTHER PUBLICATIONS

Office Action issued in connection with NZ Patent Application No. 598190, Feb. 21, 2012.
Search report issued in connection with EP Application No. 12155225.1, Jul. 25, 2013.

* cited by examiner

*Primary Examiner* — Chi Pham
*Assistant Examiner* — Shick Hom
(74) *Attorney, Agent, or Firm* — Sutherland Asbill & Brennan LLP (57) ABSTRACT

Methods and apparatuses may be provided for utility meters or other devices with communications prioritization. The methods and apparatuses may include receiving first information addressed to or from a first network device of the one or more network devices; determining that the first network device is either (i) battery-powered or associated with a limited power source, or (ii) associated with wireless communications; and based upon the determination that the first home device is either (i) battery-powered or associated with a limited power source, or (ii) associated with wireless communications, identifying the first information as higher priority. The identification of the first information as higher priority may result in the utility meter or other device processing of the first information ahead of one or more second information designated as lower priority.

18 Claims, 6 Drawing Sheets

METHODS AND APPARATUSES FOR UTILITY METERS OR OTHER DEVICES WITH COMMUNICATIONS PRIORITIZATION

FIELD OF THE INVENTION

Embodiments of the invention relate generally to utility meters, and more particularly, to methods and apparatuses for utility meters or other devices with communications prioritization.

BACKGROUND OF THE INVENTION

With a smart utility meter system, there may be a plurality of devices in communication with a utility meter. Some of these devices can be battery-powered while other devices are not battery-powered and instead may have a continuous source of power. Likewise, some of the devices can communicate via wireless communications while other devices may communicate via wired communications. Current utility meters do not differentiate between requests or communications with battery-powered devices and requests or communications with non-battery powered devices. Likewise, current utility meters do not differentiate between requests or communications with wired devices and requests or communications with wireless devices. Accordingly, in some instances, a utility meter may process a request or communication with a non-battery powered device (or alternatively, a wired device) ahead of that for a battery-powered device (or alternatively, a wireless device), thereby making a battery-powered device (or alternatively, a wireless device) remain awake for a communication or response. Thus, the life of a battery-powered device (or alternatively, a wireless device) may be shortened or may otherwise not be optimized. Accordingly, there is an opportunity for methods and apparatuses for utility meters or other devices with communications prioritization.

BRIEF DESCRIPTION OF THE INVENTION

Some or all of the above needs and/or problems may be addressed by certain embodiments of the invention. Embodiments of the invention may include methods and apparatuses for utility meters or other devices with communications prioritization.

According to one embodiment of the invention, there is disclosed a method. The method may include providing, for a utility meter or other communications prioritization apparatus, at least one communications interface for communicating with one or more network devices; receiving, by the utility meter or other communications prioritization apparatus, first information addressed to or from a first next device of the one or more network devices; determining, by the utility meter or other communications prioritization apparatus, that the first network device is either (i) battery-powered or associated with a limited power source, or (ii) associated with wireless communications; based upon the determination that the first home device is either (i) battery-powered or associated with a limited power source, or (ii) associated with wireless communications, identify the first information as higher priority, where the identification of the first information as higher priority results in the utility meter or other communications prioritization apparatus processing of the first information ahead of one or more second packets designated as lower priority.

According to another embodiment of the invention, there is disclosed an apparatus. The apparatus may include at least one communications interface for communicating with one or more network devices; and at least one processor in communication with the at least one communications interface. The at least one processor may be configured to receive first information addressed to or from a first network device of the one or more network devices; determine that the first network device is either (i) battery-powered or associated with a limited power source, or (ii) associated with wireless communications; based upon the determination that the first home device is either (i) battery-powered or associated with a limited power source, or (ii) associated with wireless communications, identify the first information as higher priority, where the identification of the first information as higher priority results in processing of the first information ahead of one or more second information designated as lower priority.

Additional systems, methods, apparatus, features, and aspects are realized through the techniques of various embodiments of the invention. Other embodiments and aspects of the invention are described in detail herein and are considered a part of the claimed invention. Other embodiments and aspects can be understood with reference to the description and the drawings.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Disclosed are methods and apparatuses for utility meters or other devices with communications prioritization. In an example embodiment of the invention, a smart utility meter may be in communication with one or more network devices (e.g., home devices and other devices) via a home area network/local area network, a neighborhood area network, or a wide area network using wired or wireless communications, as described herein. A smart utility meter in accordance with an example embodiment of the invention may determine whether information is received from or destined to a network device that is battery-powered or otherwise associated with a limited power source (or alternatively, a wireless device). If the information is received from or destined to such a limited power network device (or a wireless device), then the smart utility meter may process and/or deliver the information with higher priority than information received from or destined to a non-limited power network device (or wired device).

A smart utility meter in accordance with an example embodiment of the invention can differentiate between one or both of (i) a limited power network device and a non-limited power network device, or (ii) a wireless network device and a wired network device, based at least in part on a unique identifier or address such as a Media Access Control (MAC) address or Internet Protocol (IP) address. For example, certain wireless/limited power network devices may be associated with certain unique identifiers or addresses, while other wired/non-limited power network devices may be associated with other unique identifiers or addresses. Alternatively, a socket port number and/or communications protocol (e.g., User Datagram Protocol (UDP), Transmission Control Protocol (TCP), etc.) can be used to differentiate between one or both of (i) a limited power network device and a non-limited power network device, or (ii) a wireless network device and a wired network device. For example, certain wireless/limited power network devices may use a first communications protocol such as UDP, while wired/non-limited power network devices may utilize a first communications protocol such as TCP. These unique identifiers or addresses (or alternatively, socket port numbers and/or communications protocol) can be included in communications received from or destined to network devices, whether associated with a limited power source (or alternatively, a wireless device) or not. Accordingly, these communications received from or destined to network devices can be placed in a searchable buffer or multiple distinct buffers having different priorities associated therewith. Accordingly, the example buffers in accordance with an example embodiment of the invention can ensure that communications with a limited power network device (or wireless device) are processed and/or delivered with higher priority than those for a non-limited power network device (or wired device).

Various embodiments of the invention may include one or more special purpose computers, systems, and/or particular machines that facilitate the network communications with one or more smart utility meters and/or other network devices. A special purpose computer or particular machine may include a wide variety of different software modules as desired in various embodiments. As explained in greater detail below, in certain embodiments, these various software components may be utilized to facilitate communications between one or more network devices and one or more smart utility meters. Additionally, these various software components may be utilized to support utility meters or other devices with communications prioritization.

It will be appreciated that example embodiments of the invention may illustrate communications prioritization being performed by a utility meter. However, the communications prioritization can also be used with any network apparatus or device (e.g., home device) located in a network such as the HANs/LANs described herein. For example, these other network apparatuses or devices can include home routers (e.g., with a Zigbee radio or other radio), home displays, and energy service portals, according to example embodiments of the invention. Many variations of these network communications prioritization apparatuses or devices incorporating the communications prioritization described herein are available without departing from example embodiments of the invention.

In an example embodiment of the invention, one or more example buffers can be implemented as part of a network stack of a utility meter. An example network stack may collectively provide functionality in accordance with an example 7-layer open systems interconnection (OSI) model, which may include the following layers with associated functionality:

Layer 1—Physical (PHY) layer: Media, signal and binary transmission;
Layer 2—MAC/datalink layer: Physical addressing;
Layer 3—Network layer: Path determination and logical addressing;
Layer 4—Transport layer: End-to-end connections and reliability;
Layer 5—Session layer: Interhost communication;
Layer 6—Presentation layer: Data representation, encryption, and/or decryption; and/or
Layer 7—Application layer: Network process to software application, It will be appreciated that the example functionality of the example network stack may be implemented using fewer or additional layers without departing from example embodiments of the invention. For example, two or more layers can be combined into a single layer without departing from example embodiments of the invention. Furthermore, in implementation, layers 1 and 2 may be implemented in a first device such as a network/communications interface (e.g., a radio) while layers 3-7 may be implemented in a second device such as a processor in communication with the first device. However, it will be appreciated that variations may occur in implementation of the various layers between the first and second devices. For example, the first device such as a network/communications interface (e.g., a radio) may only have layer 1, but could alternatively, include one or more of layers 2, 3, and 4, which would result in the second device such as the processor having the remaining of the 7 layers.

In accordance with an example embodiment of the invention, the example buffers (e.g., priority buffers, searchable buffers, etc.) supporting communications prioritization may be implemented between what is referred to as a "lower network stack" and an "upper network stack", which may collectively include or support the full functionality of the example 7-layer network stack described herein. It will be appreciated that the lower network stack and the upper network stack can correspond to the respective first device and the second device, where for example, the first device may include layers 1-2 while the second device may include layers 3-7, subject to many variations in distributions of the layers. The example buffers described herein may be implemented as part of the first device or the second device. For example, the example buffers may be implemented as part of the processor that forms the second device, but alternatively could be part of the network/communications interface (e.g., a radio) that forms the first device. As such, the example buffers may be implemented between layer 2 (MAC/datalink layer) in the lower network stack and layer 3 (Network layer) in the upper network stack. Alternatively, the example buffers could be implemented between layer 1 (Physical (PHY) layer) and layer 2 (MAC/datalink layer) in a lower network stack. Many variations will be appreciated in accordance with example embodiments of the invention. However, it will be appreciated that better performance may be achieved by implementing the example buffers between lower layer numbers.

Certain embodiments of the invention described herein may have the technical effect of a utility meter prioritizing communications and processing/delivering information (e.g., packets) associated with limited power network devices In this regard, information for limited power network devices may be prioritized for processing or delivery ahead of that for non-limited power network devices. In this way, the time that a limited power network device spends waiting for a response from a utility meter can be reduced, thereby extending or lengthening a life of the limited power network device.

Figure 1:
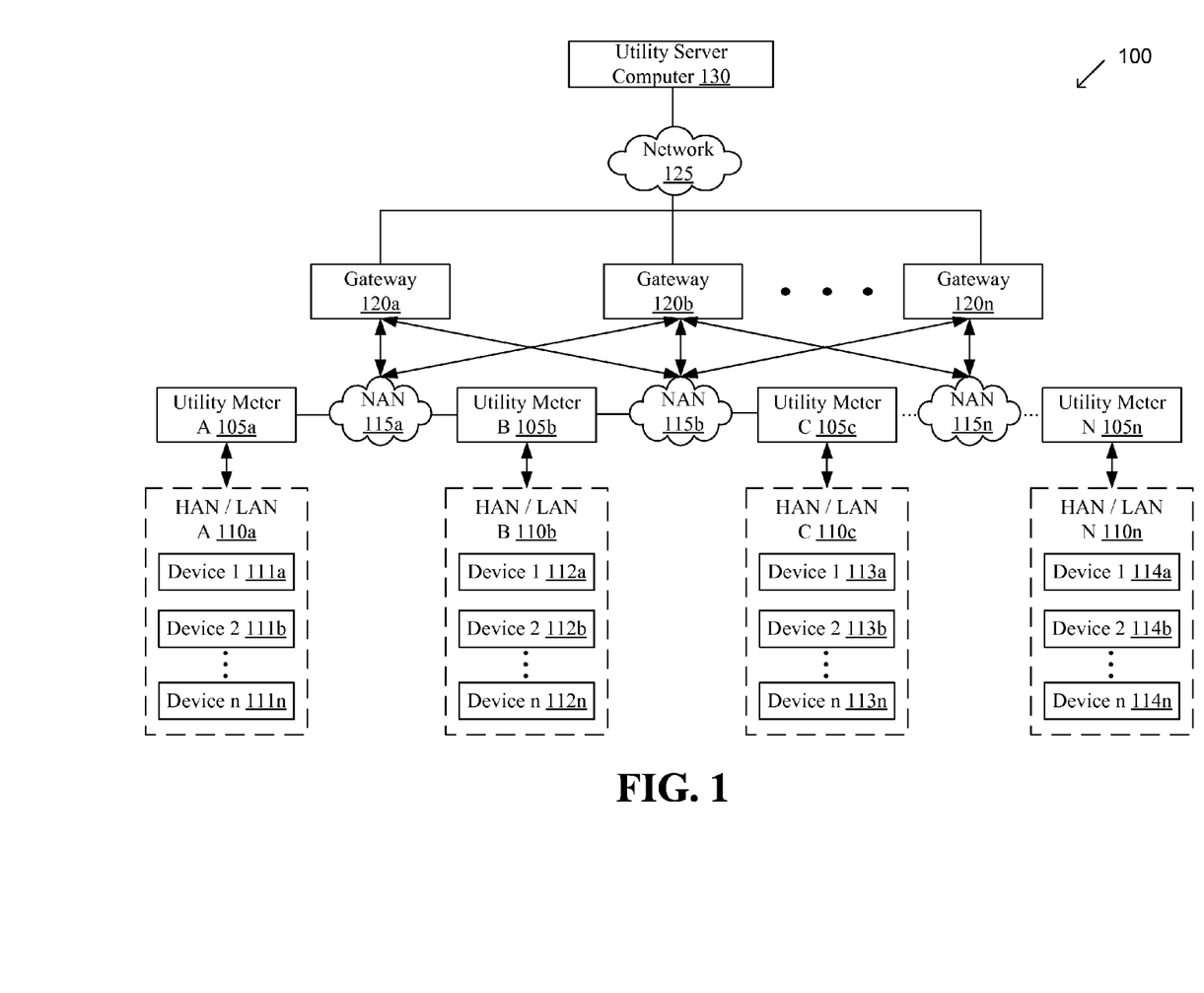
FIG. 1 is a block diagram of one example utility metering system that supports meters with communications prioritization, according to an illustrative embodiment of the invention.

FIG. 1 is a block diagram of one example utility metering system 100 that supports meters with communications prioritization, according to an illustrative embodiment of the invention. The system 100 illustrated in FIG. 1 may include a plurality of smart utility meters 105a-n, according to an example embodiment of the invention. Each smart utility meter 105a-n may be in communication with one or more home area networks (HANs) or local area networks (LANs) 110a-n using wired communications (e.g., power line carrier communications, serial communications link, USB, Ethernet, fiber optic, etc.) or wireless communications (e.g., Zigbee, Global System for Mobile Communications (GSM), Wi-Fi, Worldwide Interoperability for Microwave Access (WiMAX), General Packet Radio Service (GPRS), Bluetooth, cellular, 3G, 4G, 802.11x, radio frequency (RF) mesh communications, etc.). Where a LAN is associated with one or more customer homes, the LAN may be referred to as a HAN. For convenience, the example HAN/LAN 110a-n described herein will be understood to encompass either or both a HAN or a LAN.

Each HAN/LAN 110a-n may include or be in communication with one or more network devices, which may include one or more home devices such as lights, appliances (e.g., refrigerator, stove, oven, dishwasher, clothes washer, clothes dryer, coffee maker, etc.), televisions, security systems, air conditioning and/or heating units, home Internet modems and routers, and the like, according to an example embodiment of the invention. For example, utility meter 105a can communicate with one or more network devices 111a-n via HAN/LAN 110a. Likewise, utility meter 105b can communicate with one or more network devices 112a-n via HAN/LAN 110b. Utility meter 105c can communicate with one or more network devices 113a-n via HAN/LAN 110c. Similarly, utility meter 105n can communicate with one or more network devices 114a-n via HAN/LAN 110n. It will be appreciated that one or more of the network devices 111a-n, 112a-n, 113a-n, 114a-n may receive a metered commodity (e.g., electricity, water, gas, etc.) via a respective utility meter 105a-n.

In addition, each smart utility meter 105a-n may be in further communication with one or more neighborhood area networks (NANs) 115a-n via wired or wireless communications similar to those described herein. These NANs 115a-n may provide further connectivity to other NANs and wide area networks (WANs) 125 (e.g., the Internet, a cellular network, a satellite-based network, etc.) via one or more gateway computers 120a-n. These NANs 115a-n and/or WANs 125 can enable communications between or among utility meters 105a-n, utility server computers 130, and/or one or more other computers associated with a utility company. It will be appreciated that the NANs 115 and/or WAN 125 can be provided or accessed via wired and/or wireless communications, and collectively create an interconnected network. For example, a utility meter 105a-n can communicate with a utility server computer 130 via a gateway computer 120a-n and/or WAN 125. It will be appreciated that in some example embodiments, the WAN 125, gateway computers 120a-n, and the NANs 115a-n may be part of a same network such as the Internet. In an example embodiment of the invention, the utility meter 105a-n may also be in communication with a WAN 125 or other networks without an intermediate NAN 115a-n.

Many different communication paths between network devices may be available via the various combinations of HANs/LANs 110a-n, NANs 115a-n, gateway computers 120a-n, and WAN 125. For example, utility server computer 130 or other computers/processors associated with the utility company or another entity may communicate with various utility meters 105a-n through direct or indirect routes involving various combinations of WAN 125, gateway computers 120a-n, and other utility meters 105a-n. For example, utility server computer 130 could communicate with utility meter 105b, HAN/LAN 110b, and/or any devices 112a-n associated with HAN/LAN 110b using any combination of WAN 125, gateway computers 120a-n, and any other utility meters 105a, 105c, and/or 105n. Accordingly, in some example embodiments of the invention, utility meters 105a-n and HANs/LANs 110a-n can communicate with other network devices in performing certain routing or retransmission functionality, according to an example embodiment of the invention.

A utility meter 105a-n may be any suitable utility meter that may be connected to a commodity metering and distribution system, such as an electrical meter connected to a power distribution grid that includes any number of power lines. A wide variety of suitable electrical meters may be utilized as desired in various embodiments, such as a single phase meter or a three-phase meter. A utility meter 105a-n may be configured to measure an amount of electrical energy (e.g., kilowatt hours, etc.) or electrical power that is supplied to an associated location, residence, business, household, or machine. In an alternative embodiment of the invention, the utility meter 105a-n can also be associated with the metering and distribution of commodities other than electricity such as water, gas, and the like. Thus, the utility meter 105a-n may be configured to meter and supply or distribute commodities to an associated location, residence, business, household, or machine, including an associated network device 111a-n, 112a-n, 113a-n, or 114a-n.

In certain embodiments, the utility meter 105a-n may be a smart meter or an advanced meter that is configured to identify commodity consumption in relatively greater detail than a conventional meter. For example, a smart utility meter 105a-n may facilitate real-time or near real-time readings, commodity outage notifications, and/or commodity quality monitoring. Additionally, as desired, a smart utility meter 105a-n may communicate measurements data, calculations, and/or other information to one or more recipients, such as a utility server computer 130 of a utility company or a smart meter data processing system. Furthermore, as described herein, a smart utility meter 105a-n may be configured to support communications prioritization when processing or communicating information with one or more devices 111a-n, 112a-n, 113a-n, or 114a-n, according to an example embodiment of the invention.

As desired, embodiments of the invention may include a system 100 with more or less than the components illustrated in FIG. 1. Additionally, certain components of the system 100 may be combined or omitted in various embodiments of the invention. The system 100 of FIG. 1 is provided by way of example only, as appreciated by those of ordinary skill in the art.

Figure 2:
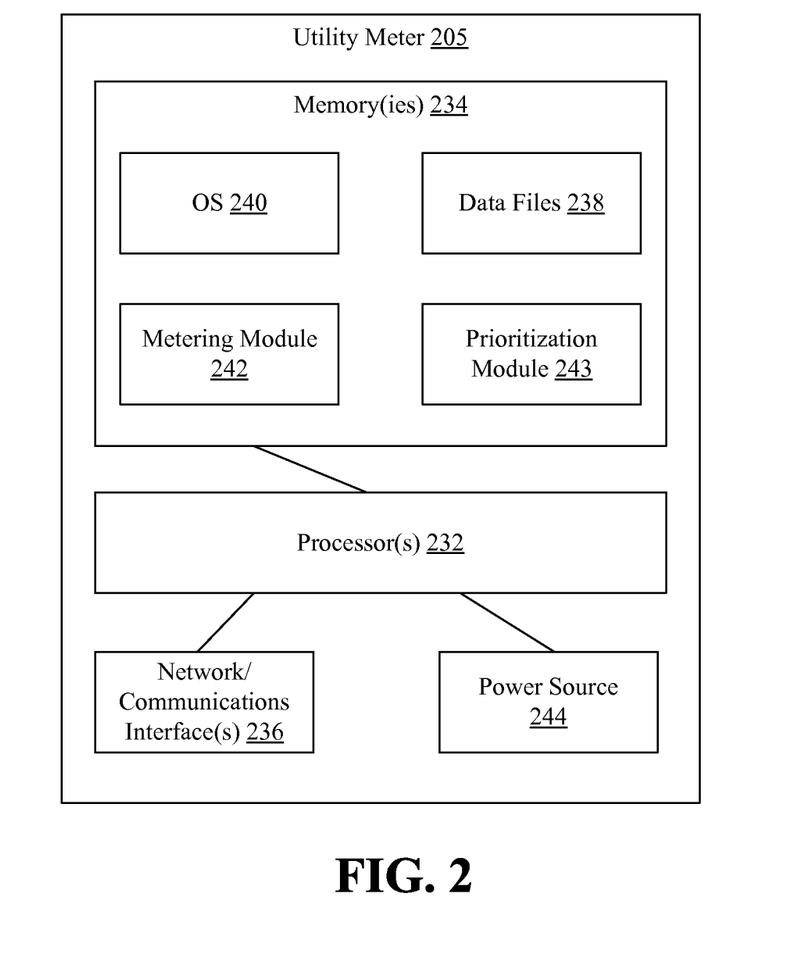
FIG. 2 illustrates an example utility meter, according to an example embodiment of the invention.

FIG. 2 illustrates an example utility meter 205, according to an example embodiment of the invention. The utility meter 205 of FIG. 2 may be an example implementation of any one of the utility meters 105a-n of FIG. 1. As shown in FIG. 2, an example utility meter 205 may include any number of suitable computer processing components that facilitate the operation of the utility meter and/or the provision of a utility service and/or commodity (e.g., electricity, water, gas, etc.) to a location, including a customer home location. Examples of suitable processing devices that may be incorporated into a utility meter 205 include, but are not limited to, application-specific circuits, microcontrollers, minicomputers, other computing devices, and the like. As such, a utility meter 205 may include any number of processors 232 that facilitate the execution of computer-readable instructions. By executing computer-readable instructions, the utility meter 205 may include or form a special purpose computer or particular machine that facilitates the provision of a utility service and/or the provision of a commodity to a location.

In addition to one or more processor(s) 232, the utility meter 205 may include one or more memory devices 234 and/or one or more network and/or communications interfaces 236. The one or more memory devices 234 or memories may include any suitable memory devices, for example, caches, read-only memory devices, random access memory devices, magnetic storage devices, etc. The one or more memory devices 234 may store data, executable instructions, and/or various program modules utilized by the utility meter 205, for example, data files 238, an operating system ("OS") 240, a metering module 242, and/or a prioritization module 243. The data files 238 may include, for example, stored data associated with the operation of a utility meter 205, stored data associated with measurements and/or readings taken by the utility meter 205, utility meter configuration information, stored requests, messages and/or alerts, and/or stored commodity management, usage, and/or distribution data. The data files 238 can further provide information supporting packet or information prioritization. For example, the data files 238 may include unique identifiers or other identifiers for battery-powered or limited power source network devices (e.g., home devices) that are connected or in communication with utility meter 205, such as any of devices 111a-n, 112a-n, 113a-n, or 114a-n. For example, the data files 238 can maintain a MAC address or IP address for battery-powered or limited power source network devices.

The OS 240 may include executable instructions and/or program modules that facilitate and/or control the general operation of the utility meter 205. For example, the OS 240 may facilitate the execution of other software programs and/or program modules by the processors 232. The prioritization module 243 may be configured to identify one or more home devices that are battery-powered or associated with a limited power source. The determination may be utilized in conjunction with a network stack, as described herein, for example, to determine which priority buffer to place a packet or information in, or which packet or information to retrieve next from a searchable buffer.

The one or more network/communications interfaces 236 associated with the utility meter 205 can include a HAN/LAN interface and a NAN interface. The LAN interface can be used for communicating or connecting with one or more HANs/LANs such as HANs/LANs 110a-n of FIG. 1, and the NAN interface can be used for communicating or connecting with one or more NANs such as NANs 115a-n of FIG. 1. In this regard, a utility meter 205 may receive data from and/or communicate data to other components of the system 100. The one or more network/communications interfaces 236, including the HAN/LAN interface and/or the NAN interface, can be implemented as one or more network cards, adaptors, or transceivers for communicating over wired interfaces (e.g., power line carrier communications, serial communications link, USB, Ethernet, fiber optic, etc.) and/or wireless interfaces (e.g., ZigBee, GSM, Wi-Fi, WiMAX, Bluetooth, GRPS, cellular, 3G, 4G, 802.11x, RF mesh communications, etc.). It will be appreciated that the one or more network/communications interfaces 236 can also be utilized for communicating or connecting with one or more other network devices or networks, including WAN 125 of FIG. 1, without departing from example embodiments of the invention.

According to an example embodiment of the invention, the utility meter 205 can include or utilize a network stack to manage the flow of information between one or more HANs/LANs. A network stack in accordance with an example embodiment of the invention may include a lower network stack and an upper network stack. For example, the lower network stack may include a PHY layer and a MAC layer while the upper network stack may include an LLC layer, a transport layer, and an application layer. A searchable buffer or multiple priority buffers may be provided between the lower network stack and the upper network stack, or may be implemented as part of either the lower network stack or the upper network stack. In an example embodiment of the invention, a first portion of the network stack may be implemented as part of the hardware of the network/communications interface(s) 236, and a second portion of the network stack may be implemented as part of the memory 234. For example, the lower network stack may be implemented as part of network/communications interface(s) 236 while the upper network stack may be implemented as part of the memory 234. The example buffer(s), including a searchable buffer and/or the priority buffers, described herein may be implemented as either part of the network communications interface(s) 236 or the memory 234 (e.g., as part of prioritization module 243, OS 240, or another module). It will be appreciated that the variations of the example network stack are available in accordance with example embodiments of the invention. According to one variation, in the lower network stack, the PHY layer and the MAC layer may be integrated into a single layer. Similarly, in the upper network stack, one or more of the LLC layer, a transport layer, and the application layer can be combined into a single layer. Indeed, the logical separation of the different layers of the lower network stack and the upper network stack can be embodied in many forms to facilitate delivery, transport, and/or conversion of information between a physical network connection and a software application, or vice versa. Many variations of an example network stack are available without departing from example embodiments of the invention.

The utility meter 205 may typically receive a commodity from a connected commodity line, grid and/or source, and likewise meter and distribute the commodity to an associated location, residence, business, household, or machine, including an associated network device 111a-n, 112a-n, 113a-n, 114a-n. Additionally, as desired in certain embodiments, the utility meter 205 may include any number of suitable power sources 244, which can include wired power supplies and solar power cells, as well as back-up power supplies such as one or more batteries, fuel cells, or one or more super capacitors.

Figure 3A:
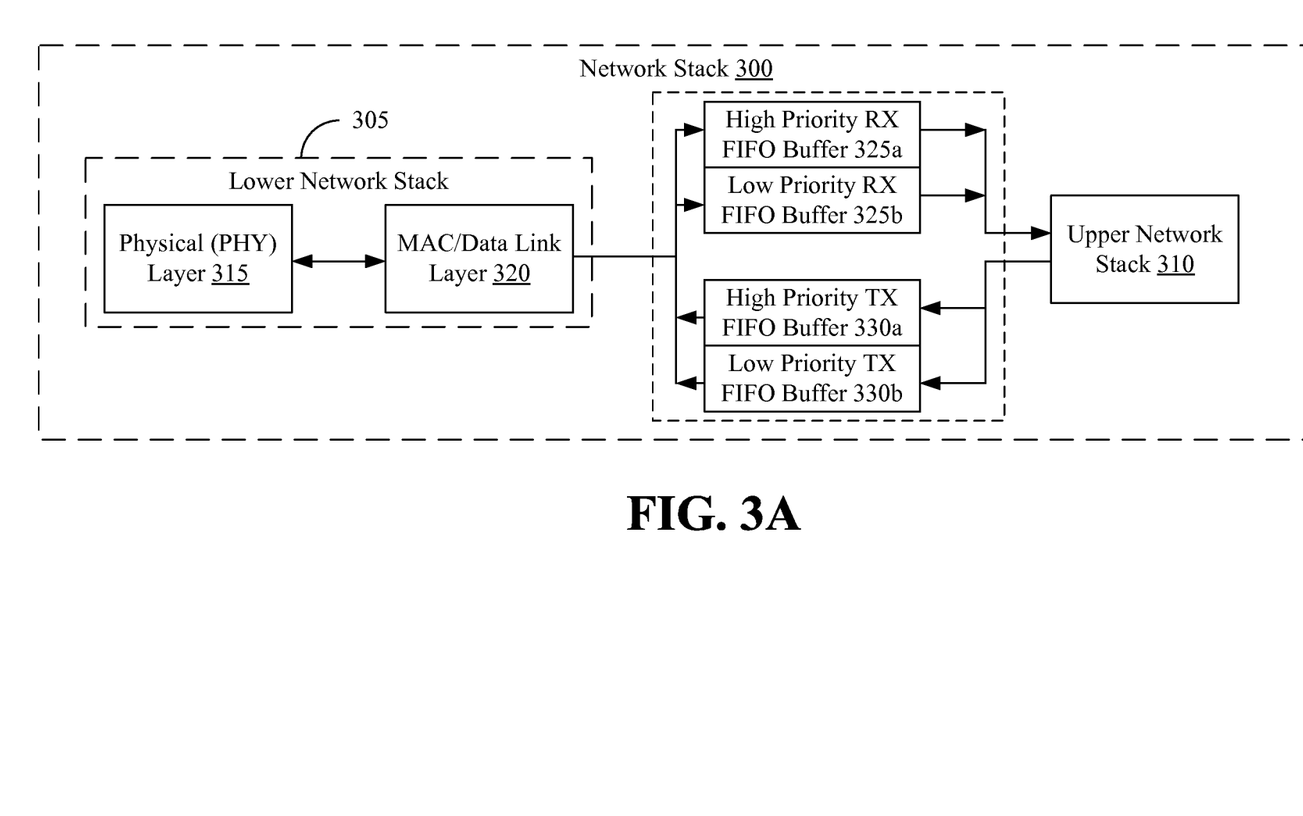
FIGS. 3A and 3B illustrate an example network stack utilizing a plurality of priority buffers in accordance with an example embodiment of the invention.
Figure 3B:
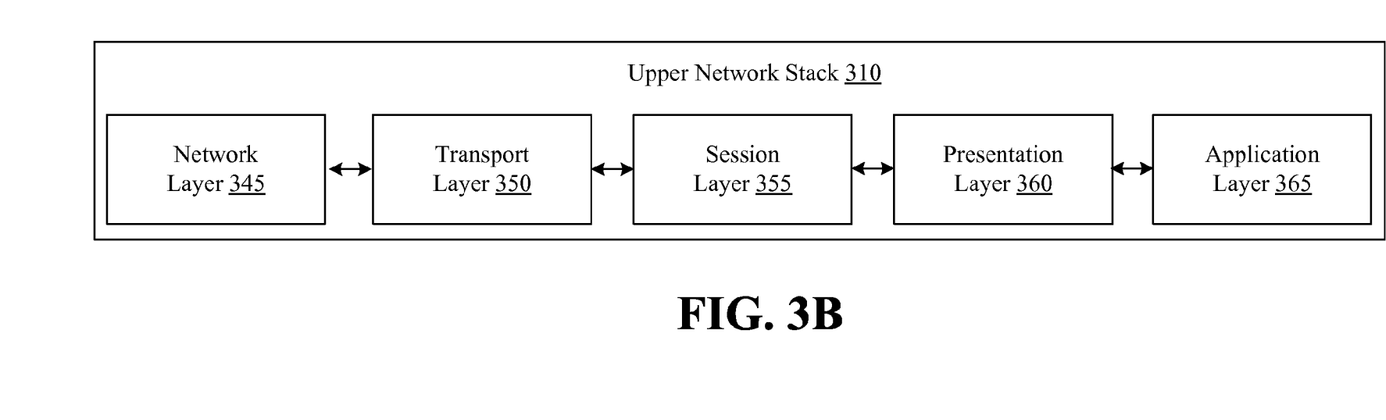

FIGS. 3A and 3B illustrate an example network stack 300 utilizing a plurality of priority buffers in accordance with an example embodiment of the invention. The example network stack 300 may be implemented as part of the network/communications interface(s) 236 and/or memory 234, according to an example embodiment of the invention. Turning now to FIG. 3A, an example network stack 300 may include at least a lower network stack 305 and an upper network stack 310. The lower network stack 305 may include a physical (PHY) layer 315 (layer 1) and a MAC/Data Link Layer 320 (layer 2). Likewise, as shown in FIG. 3B, the upper network stack 310 may include a network layer 345 (layer 3), a transport layer 350 (layer 4), a session layer 355 (layer 5), a presentation layer 360 (layer 6), and an application layer 365 (layer 7). A plurality of receive (RX) buffers and transmit (TX) priority buffers may be configured, operable, or provided to facilitate transfer of data and information between the lower network stack 305 and the upper network stack 310. The RX buffers may receive and store data and information from the lower network stack 305 (e.g., MAC/Data Link Layer 320) until the upper network stack 310 has an opportunity to retrieve the data and information from the RX buffers for subsequent processing. Likewise, the TX buffers may receive and store data and information from the upper network stack 310 until the lower network stack 305 has an opportunity to retrieve the data and information from the TX buffers for transmission to one or more network devices.

In FIG. 3A, there are two RX priority buffers 325a, 325b, and two TX priority buffers 330a, 330b. In particular, RX priority buffer 325a may be a high priority RX first-in, first-out (FIFO) buffer while RX priority buffer 325b may be a low priority RX FIFO buffer. With respect to the RX priority buffers, the data and information stored in high priority RX FIFO buffer 325a may have priority over the data and information stored in low priority RX FIFO buffer 325b. Accordingly, the upper network stack 310 may retrieve data and information from high priority RX FIFO buffer 325a first for processing before retrieving data and information from low priority RX FIFO buffer 325b. As will be described herein with respect to FIG. 5, the lower network stack 305 may deliver information or data received from limited power source network devices (or wireless devices) to the high priority RX FIFO buffer 325a. On the other hand, the lower network stack 305 may deliver information or data that is received from non-limited power source network devices (or wired devices) to the low priority RX FIFO buffer 325b. It will be appreciated that there may be more than two RX priority buffers in accordance with alternative embodiments of the invention. For example, there may be a high priority RX buffer, a medium priority RX buffer, and a low priority RX buffer without departing from example embodiments of the invention. In such a case, the high priority RX buffer would take priority over the medium priority RX buffer, which itself would take priority over the low priority RX buffer.

Similarly, TX priority buffer 330a may be a high priority TX FIFO buffer while TX priority buffer 330b may be a low priority TX FIFO buffer. With respect to the TX priority buffers, the data and information stored in high priority TX FIFO buffer 330a may have priority over the data and information stored in low priority TX FIFO buffer 330b. Accordingly, the lower network stack 305 may retrieve data and information from the high priority TX FIFO buffer 330a first for delivery to one or more network devices before retrieving data and information from low priority TX FIFO buffer 330b. As will be described herein with respect to FIG. 5, the upper network stack 310 may deliver information or data that is to be transmitted to limited power source network devices (or wireless devices) to the high priority TX FIFO buffer 330a. On the other hand, the upper network stack 310 may deliver information or data that is to be transmitted to non-limited power source network devices (or wired devices) to the low priority TX FIFO buffer 330b. It will be appreciated that there may be more than two TX priority buffers in accordance with alternative embodiments of the invention. For example, there may be a high priority TX buffer, a medium priority TX buffer, and a low priority TX buffer without departing from example embodiments of the invention. In such a case, the high priority TX buffer would take priority over the medium priority TX buffer, which itself would take priority over the low priority TX buffer. The upper network stack 310 may then deliver information or data to the appropriate priority TX buffer based upon the priority of delivery of the information or data.

Figure 4:
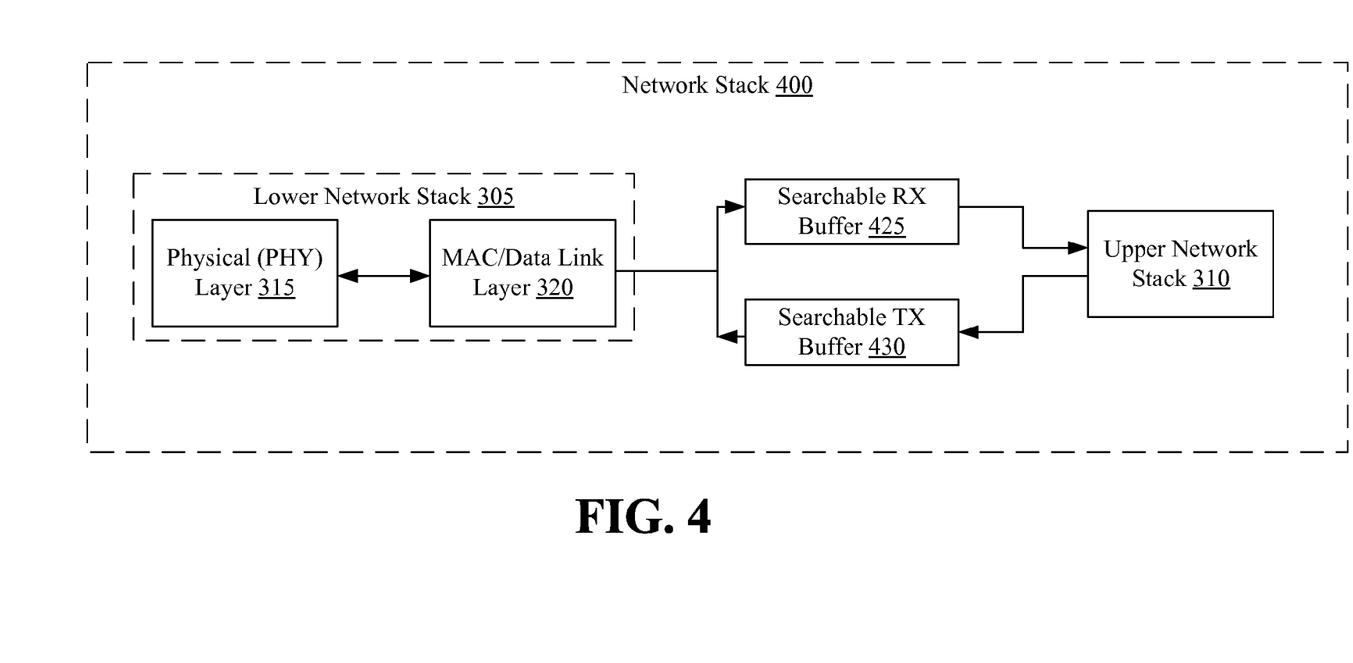
FIG. 4 illustrates an example network stack utilizing searchable buffers, according to an example embodiment of the invention.

FIG. 4 illustrates an alternative to the network stack of FIGS. 3A-3B where searchable buffers may be utilized instead of priority buffers, according to an example embodiment of the invention. The lower network stack 305 and the upper network stack 310 in FIG. 4 are similar to those described with respect to FIGS. 3A-3B. However, in FIG. 4, there may be searchable RX buffer 425 and a searchable TX buffer 430. The use of a searchable RX buffer 425 may eliminate the need for multiple RX priority buffers according to an example embodiment of the invention. Likewise, the use of a searchable TX buffer 430 may eliminate the need for multiple TX priority buffers according to an example embodiment of the invention.

However, the use of searchable buffers 425, 430 may require that data or information stored in those buffers include one or more identifiers to designate, either directly or indirectly, the respective priority of the stored data or information. According to an example embodiment of the invention, the identifier may be a unique address such as a MAC address or IP address associated with the source or destination of the stored data or information. The unique address can then be referenced with one or more lists, records, or tables, perhaps in memory 234 or another storage location, that identifies those unique addresses associated with, for example, a high-priority status (e.g., a limited power source network device, a wireless network device, etc.) or a low-priority status (e.g., a non-limited power source network device, a wired network device, etc.), according to an example embodiment of the invention. Alternatively, in an example embodiment of the invention, the data or information may be stored with other direct identifiers, fields, or codes to designate respective priorities (e.g., Priority Code="H" for high priority or "L" for low priority). As another alternative, the identifier can be a socket port number and/or communications protocol (e.g., UDP, TCP, etc.). For example, a first socket port number and/or first communications protocol (e.g., UDP) may be associated with, for example, a high-priority status (e.g., a limited power source network device, a wireless network device, etc.) while a second socket port number and/or second communications protocol (e.g., TCP) may be associated with, for example, a low-priority status (e.g., a non-limited power source network device, a wired network device, etc.). Many different variations of identifiers, whether explicit or implicit, are available for designating the respective priority of the data or information stored in a searchable buffer, according to an example embodiment of the invention.

While FIGS. 3A-3B and 4 have been described with respect to buffers, these buffers also may include one or more other types of memories or memory devices beyond traditional buffers. For example, the buffers can also include queues, caches, and other types of random access memory without departing from example embodiments of the invention.

Figure 5:
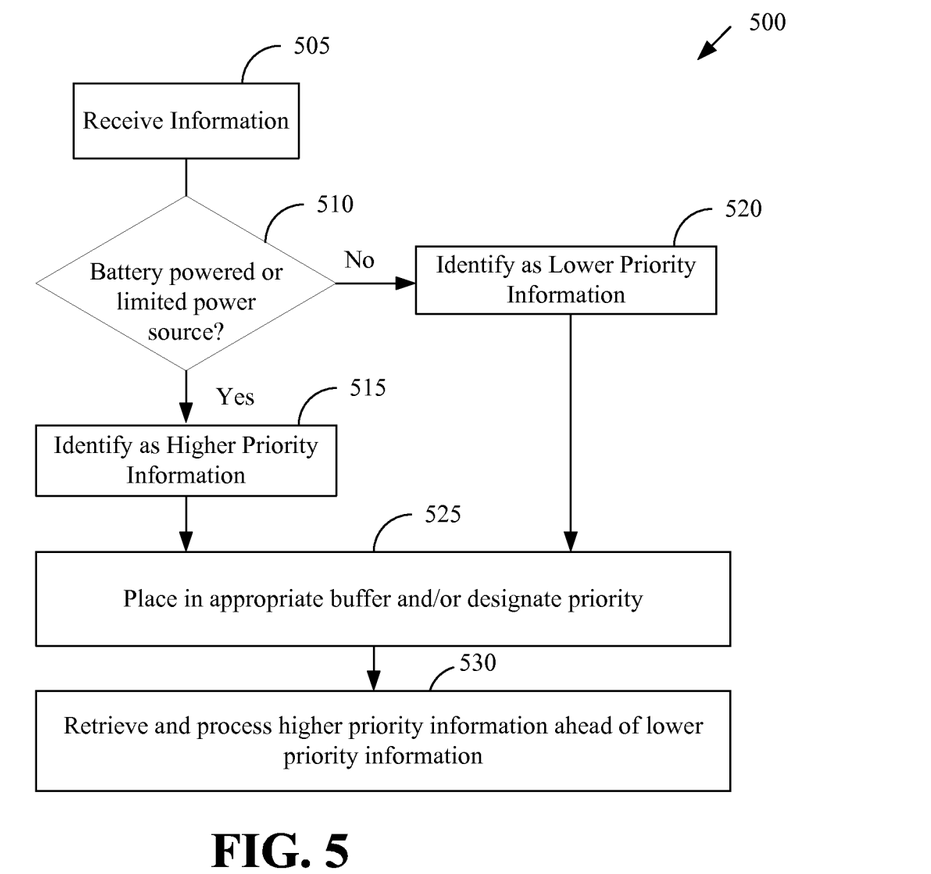
FIG. 5 illustrates an example flow diagram of a method for communications prioritization for a utility meter, according to an example embodiment of the invention.

FIG. 5 illustrates an example flow diagram of a method for communications prioritization for a utility meter, according to an example embodiment of the invention. In certain embodiments, the operations of the method 500 may be performed by the example utility meter 205 of FIG. 2. For example, the operations of the method 500 may be implemented as computer-executable instructions (e.g., available in a memory 234, a network/communications interface 236 memory, a processor 232 memory, etc.) and/or specialized hardware executed by a network/communications interface 236 (e.g., a radio), a processor 232, or a combination thereof.

Because the example utility meter 205 of FIG. 2 is representative of any of the utility meters 105*a-n* of FIG. 1, it will be appreciated that the operations of the method 500 of FIG. 5 can likewise be performed by any of the utility meters 105*a-n*, or other utility meters in accordance with embodiments of the invention. For illustrative purposes, the method 500 of FIG. 5 will be discussed as being performed by the example utility meter 105*a*. The example utility meter 105*a* may be in communication with one or more network devices 111*a-n*, which when located in, near, or around a customer home, can be referred to as a home device. These network devices 111*a-n* may include lights, appliances (e.g., refrigerator, stove, oven, dishwasher, clothes washer, clothes dryer, coffee maker, etc.), televisions, security systems, air conditioning and/or heating units, and home Internet modems and routers. It will be appreciated that network devices 111*a-n* can also be located outside of a customer home or location, and can communicate with the example utility meter using wired or wireless communications without departing from example embodiments of the invention. Furthermore, the example utility meter 105*a* may be in communication with one or more other network devices via a NAN such as NAN 115*a*, or alternatively, other NANs 115*b-n* or WAN 125. For example, these other network devices can include other utility meters 105*b-n*, gateway computers 120*a-n*, routing or switching devices, or other computing devices, and the like. It will further be appreciated that the example method 500 may likewise be performed by any of utility meters 105*b-n* without departing from example embodiments of the invention.

Turning now to FIG. 5, at block 505, information may be received or generated by the network stack of the utility meter 105*a*. The information may be in different formats depending upon whether it is information received from one or more network devices (e.g., network devices 111*a-n*) or information received or generated for transmission to one or more network devices, which may include one or more home devices. As an example, information received from one or more network devices by a lower network stack 305 may be in the form of a packet or frame, according to an example embodiment of the invention.

Following block 505 is block 510. If the information received at block 505 was received from a network device, then block 510 may determine whether the received information is associated with a transmitting network device that is battery-powered or otherwise associated with a limited power source. To make this determination, block 510 may examine the received information to determine whether the information itself includes any specific identifier or code that designates the received information as being associated with a network device that is battery-powered or otherwise associated with a limited source of power. Otherwise, block 510 can also obtain the unique address or identifier (e.g., IP address, MAC address, etc.) of the transmitting network device, and utilize a stored high priority list, record or table in memory 234 or another location to identify whether the unique address or identifier is associated with a network device that is battery-powered or otherwise associated with a limited source of power. In the alternative, block 510 may also determine whether the received information is associated with a transmitting network device that is communicating via wireless communications. To do so, block 510 may determine, for example, whether the received information was received from a network/communications interface 236 that is known to be a wireless interface (e.g., Zigbee, WiFi, 802.11x, etc.). Alternatively, block 510 can also obtain the unique address or identifier (e.g., IP address, MAC address, etc.) of the transmitting network device, and utilize a stored high priority list, record or table in memory 234 or another location to identify whether the unique address or identifier is associated with a network device that transmits wirelessly.

On the other hand, the information received at block 510 may be received or generated by the upper network stack 310 of utility meter 105*a* for transmission to a network device. In this case, block 510 may determine whether information for transmission is destined for a receiving network device that is battery-powered or otherwise associated with a limited power source. To make this determination, block 510 can obtain the unique destination address or identifier (e.g., IP address, MAC address, etc.) of the receiving network device, and utilize a stored high priority list, record or table in memory 234 or another location to identify whether the unique address or identifier is associated with a network device that is battery-powered or otherwise associated with a limited source of power. In the alternative, block 510 may also determine whether the received information is associated with a transmitting network device that is communicating via wireless communications. To do so, block 510 may obtain the unique destination address or identifier (e.g., IP address, MAC address, etc.) of the receiving network device, and utilize a stored high priority list, record or table in memory 234 or another location to identify whether the unique address or identifier is associated with a network device that receives wirelessly. Alternatively, if the information is designated for transmission from a network/communications interface 236 that is known to be a wireless interface (e.g., Zigbee, WiFi, 802.11x, etc.), the block 510 can also determine that the information is for transmission to a receiving network device that is communicating via wireless communications. Many variations of block 510 are available without departing from example embodiments of the invention.

If block 510 determines that the received information is associated with a network device that is battery-powered or otherwise associated with a limited source of power (or alternatively, a wireless network device), then processing may proceed to block 515, where the information is identified as high priority information that should take priority for delivery or processing over lower priority information. In some embodiments, block 515 may include providing or including an identifier or code with the information to indicate or designate its high priority status, perhaps where a searchable buffer (e.g., buffer 425, 430) is being utilized.

On the other hand, block 510 may otherwise determine that the received information is associated with a network device that is not battery-powered or otherwise not associated with a limited source of power (or alternatively, is a wired network device), and processing may proceed to block 520. At block 520, the information may be identified as low priority information that is of a lesser priority for delivery or processing compared to high priority information.

Following either block 515 or block 520 is block 525. At block 525, the information may be placed in the appropriate buffer based upon the identified priority at block 515 or block 520. Where the information is received from a transmitting device, the information can be placed in an appropriate RX buffer such as one of the RX priority buffers 325*a*, 325*b*, or searchable RX buffer 425. Likewise, where the information is for transmission to a receiving device, the information can be placed in an appropriate TX buffer such as one of the TX priority buffers 330*a*, 330*b*, or searchable TX buffer 430. As an example, high priority information that is received from a transmitting network device may be placed in high priority RX FIFO buffer 325*a*, while low priority information that is received from a transmitting network device may be placed in a low priority RX FIFO buffer 325*b*. As another example, high priority information that is for transmission to a receiving network device may be placed in high priority TX FIFO buffer 330a while low-priority information that is for transmission to a receiving network device may be placed in low priority TX FIFO buffer 330b. On the other hand, where the information is placed in a searchable buffer 425, 430, the information may include an identifier or code with the information to indicate or designate its priority (e.g., high priority, low priority, etc.). Alternatively, the unique address (e.g., IP address, MAC address) may serve as the identifier or code for designating the priority of the information, and no additional identifier or code may be needed, according to an example embodiment of the invention. It will be appreciated that in some example embodiments, only a high priority status may be designated with the implicit knowledge that a lack of a priority status may indicate a lower priority status, or vice versa.

Following block 525 is block 530. At block 530, information may be retrieved and/or processed from the buffers. More specifically, high priority information may be retrieved or received and processed from the buffers ahead of lower priority information. For example, the upper network stack 310 may initially retrieve or receive information for processing from high priority RX FIFO buffer 325a until the buffer 325a is empty. Once the high priority RX FIFO buffer 325a is empty, then the upper network stack 310 may retrieve information for processing from the low priority RX FIFO buffer 325b. Similarly, the lower network stack 305 may initially retrieve or receive information for processing/delivery from the high-priority TX FIFO buffer 330a until the buffer 330a is empty. Once the high priority TX FIFO buffer 330a is empty, then the lower network stack 305 may retrieve information for processing from the low priority TX FIFO buffer 330b. In an example embodiment of the invention, the buffers 325a, 325b, 330a, 330b may be FIFO buffers in which case information may be retrieved from the respective buffers on a first-in, first-out basis, as appreciated by those of ordinary skill in the art.

Block 530 may operate slightly differently if searchable buffers such as buffers 425, 430 are utilized instead of priority buffers. For example, the upper network stack 310 may retrieve or receive information for processing from searchable RX buffer 425, while the lower network stack 305 may retrieve or receive information for processing from searchable TX buffer 430. However, both high priority information and low priority information may both be stored in respective searchable buffers 425, 430, and as such, the retrieval of the information may require additional analysis of the stored information. In particular, to identify the high priority information in a searchable buffer 425, 430, the respective buffer may be searched to identify an identifier or code, or lack thereof, included with the stored information to designate a high-priority status. Alternatively, the respective buffers 425, 430 may be searched for stored information having a unique address or identifier (e.g., IP address, MAC address, etc.) associated with a source or destination network device that is associated with a high priority status (e.g., a battery-powered or limited power source device, or alternatively, a wireless device). Accordingly, the high priority information may be retrieved from buffers 425, 430 for processing and/or delivery ahead of the low priority information stored in the respective buffers. According to an example embodiment, the buffers 425, 430 may still be FIFO buffers insofar as the first set of high priority information may be processed in a first in, first out manner, while the second set of low priority information may likewise be processed in a first in, first out manner, where all of the first set of high priority information may be processed ahead of the second set of low priority information, according to an example embodiment of the invention.

The operations described and shown in the method 500 of FIG. 5 may be carried out or performed in any suitable order as desired in various embodiments of the invention. Additionally, in certain embodiments, at least a portion of the operations may be combined or carried out in parallel. Furthermore, in certain embodiments, less than or more than the operations described in FIG. 5 may be performed. As desired, the operations set forth in the method 500 may be performed in a loop for continuous monitoring.

The invention is described above with reference to block and flow diagrams of systems, methods, apparatuses, and/or computer program products according to example embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. An apparatus, comprising:
   at least one communications interface for communicating with one or more network devices; and
   at least one processor in communication with the at least one communications interface, the at least one processor configured to:
      receive first information addressed to or from a first network device of the one or more network devices;
      determine that the first network device is either (i) battery-powered or associated with a limited power source, or (ii) associated with wireless communications, wherein the association with wireless communications results when the first network device is not associated with wired communications; and
      based upon the determination that the first network device is either (i) battery-powered or associated with the limited power source, or (ii) associated with wireless communications, identify the first information as higher priority,
      wherein the identification of the first information as higher priority results in processing of the first information ahead of one or more second information designated as lower priority, wherein the processing of the first information includes one of (i) retrieving the first information for additional processing by an upper network stack, or (ii) transmitting the first information to the first home device.

2. The apparatus of claim 1, wherein the at least one processor is further configured to designate the first information as higher priority.

3. The apparatus of claim 2, further comprising:
   at least one high priority buffer; and
   at least one low priority buffer;
   wherein the first information is designated as higher priority by being placed in one or more of the at least one high priority buffer, wherein the processor is further configured to retrieve information from the at least one high priority buffer ahead of information in the at least one low priority buffer.

4. The apparatus of claim 1, wherein the first information is identified as higher priority based upon the first information being stored with one or more indicators in a searchable buffer.

5. The apparatus of claim 4, wherein the one or more indicators comprise a network address associated with the first network device.

6. The apparatus of claim 1, wherein the first information is identified as higher priority based upon one or more of (i) its source or destination network address, (ii) an associated socket port number, or (iii) an associated communications protocol.

7. The apparatus of claim 6, wherein the source or destination network address is one or both of (i) an Internet Protocol (IP) address, or (ii) a media access control (MAC) address.

8. The apparatus of claim 6, wherein the first information is identified as higher priority based upon its source or destination network address being included on a high priority list or record, wherein the high priority list or record includes respective network addresses identifying one or more network devices known to be (i) battery-powered or associated with a limited power source, or (ii) communicating wirelessly.

9. The apparatus of claim 1, wherein the first network device is a home network device in a home area network (HAN) accessible via the at least one communications interface.

10. The apparatus of claim 1, wherein the at least one communications interface includes a wireless communications interface and a wired communications interface.

11. The apparatus of claim 10, wherein the first network device is determined to be associated with wireless communications based upon receipt of the first information via the wireless communications interface, wherein information received via the wireless communications interface is identified to be at the higher priority over information received via the wired communications interface.

12. A method, comprising:
   providing, for a utility meter or other communications prioritization apparatus, at least one communications interface for communicating with one or more network devices;
   receiving, by the utility meter or other communications prioritization apparatus, first information addressed to or from a first network device of the one or more network devices;
   determining, by the utility meter or other communications prioritization apparatus, that the first network device is either (i) battery-powered or associated with a limited power source, or (ii) associated with wireless communications, wherein the association with wireless communications results when the first network device is not associated with wired communications; and
   based upon the determination that the first network device is either (i) battery-powered or associated with the limited power source, or (ii) associated with wireless communications, identify the first information as higher priority,
   wherein the identification of the first information as higher priority results in the utility meter or other communications prioritization apparatus processing of the first information ahead of one or more second information designated as lower priority, wherein the processing of the first information includes one of (i) retrieving, by the utility meter or other communications prioritization apparatus, the first information for additional processing by an upper network stack, or (ii) transmitting, by the utility meter or other communications prioritization apparatus, the first information to the first home device.

13. The method of claim 12, further comprising:
   designating, by the utility meter or other communications prioritization apparatus, the first information as higher priority.

14. The method of claim 12, further comprising:
   providing, for the utility meter or other communications prioritization apparatus, at least one high priority buffer, and at least one low priority buffer, wherein the first information is designated as higher priority by being placed in one or more of the at least one high priority buffer, wherein the utility meter or other communications prioritization apparatus is configured to retrieve packets from the at least one high priority buffer ahead of packets in the at least one low priority buffer.

15. The method of claim 12, wherein the first information is identified as higher priority based upon the first information being stored with one or more indicators in a searchable buffer, the one or more indicators comprising a network address associated with the first network device.

16. The method of claim 12, wherein the first information is identified as higher priority based upon one or more of (i) its source or destination network address, (ii) an associated socket port number, or (iii) an associated communications protocol.

17. The method of claim 12, wherein the first network device is a home network device in a home area network (HAN) accessible via the at least one communications interface.

18. The method of claim 12, wherein the at least one communications interface includes a wireless communications interface and a wired communications interface, wherein the first network device is determined to be associated with wireless communications based upon receipt of the first information via the wireless communications interface, wherein information received via the wireless communications interface is identified to be at the higher priority over information received via the wired communications interface.

* * * * *

UNITED STATES PATENT AND TRADEMARK OFFICE
CERTIFICATE OF CORRECTION

| | | |
|---|---|---|
| PATENT NO. | : 9,124,614 B2 | Page 1 of 1 |
| APPLICATION NO. | : 13/028142 | |
| DATED | : September 1, 2015 | |
| INVENTOR(S) | : Ree | |

It is certified that error appears in the above-identified patent and that said Letters Patent is hereby corrected as shown below:

IN THE SPECIFICATION
In Column 4, Line 19, delete "application," and insert -- application. --, therefor.

Signed and Sealed this
Twenty-second Day of March, 2016

Michelle K. Lee
*Director of the United States Patent and Trademark Office*